United States Patent [19]
Dalle Mura

[11] 3,765,338
[45] Oct. 16, 1973

[54] NONLINEAR INDUCTOR PROXIMITY FUZE

[75] Inventor: Pio H. Dalle Mura, Baltimore, Md.

[73] Assignee: The United States of America as represented by the Secretary of the Navy, Washington, D.C.

[22] Filed: Nov. 18, 1955

[21] Appl. No.: 547,873

[52] U.S. Cl. .............................. 102/70.2 P, 334/71
[51] Int. Cl. ......................... F42c 13/06, F42c 13/00
[58] Field of Search ...................... 102/70.2, 70.2 P; 250/40 B, 40 A; 334/78

[56] References Cited

UNITED STATES PATENTS 2,296,915 9/1942 Foster ................................. 250/40

FOREIGN PATENTS OR APPLICATIONS 585,791 2/1947 Great Britain ................. 102/70.2 P

OTHER PUBLICATIONS

"The Variation in the H.-F. Resistance and Permeability of Ferromagnetic Materials Due to a Superimposed Magnetic Field." - J. S. Webb. - Proc. I.R.E., Vol. 26, No. 4, Apr. 1938, pp. 433–441.
Proximity Fuzes for Artillery, by Harner Selvidge, February 1946, Issue of Electronics Magazine pp. 104–109 are Pertinent.

*Primary Examiner*—Benjamin A. Borchelt
*Assistant Examiner*—Thomas H. Webb
*Attorney*—G. J. Rubens and R. F. Hassfeld

EXEMPLARY CLAIM

1. An apparatus for exploding a projectile in proximity to a target, comprising, an oscillator for generating an electromagnetic wave, an antenna coupled to said oscillator for radiating said generated wave and for receiving a target reflected portion of said wave, a detector connected to said oscillator for developing a beat frequency output signal proportional to the frequency variation between the generated and reflected waves, an audio amplifier connected to said detector for amplifying said output signal, amplifier means including a nonlinear frequency responsive resonant network for selectively developing a control signal having an abrupt substantial amplitude variation in response to an amplified output signal of a preselected frequency and firing means connected to said amplifier means for utilizing said control signal to explode said projectile.

5 Claims, 3 Drawing Figures

INVENTOR
PIO H. DALLE MURA

BY

ATTORNEYS

NONLINEAR INDUCTOR PROXIMITY FUZE

This invention relates generally to a proximity fuze for a projectile or the like and more particularly to a proximity fuze having a nonlinear frequency responsive firing circuit.

It is a well known fact to those versed in the proximity fuze art that the ripple signal developed in a proximity fuze by the wave energy reflected from a target surface contains both amplitude and frequency intelligence which may be utilized in the design of a proximity fuze.

Existing versions of the proximity fuze generally utilize the amplitude intelligence in the reflected wave energy, or doppler signal, and are substantially amplitude responsive devices. A typical amplitude responsive proximity fuze generally comprises an antenna, an oscillator-detector circuit, an audio amplifier circuit and a thyratron firing circuit. The oscillator radiates an electromagnetic wave, part of which is intercepted by the target and reflected back to the fuze antenna and fed into the oscillator-detector wherein a target ripple signal is developed and amplified by the audio amplifier and then fed directly to the thyratron firing circuit. When the amplified ripple signal amplitude exceeds the ionization potential of the thyratron, a charged condenser is discharged through the thyratron and a primer device thereby detonating the fuze. It therefore is apparent that except for some frequency selection performed by the band pass characteristics of the audio amplifier this proximity fuze circuit is essentially an amplitude sensitive circuit.

Accordingly one object of the present invention is to provide a proximity fuze utilizing the frequency intelligence contained in the target reflected doppler signal.

Another object of the present invention is to provide a proximity fuze having a nonlinear frequency responsive circuit as the firing time device.

A further object of the present invention is to provide a nonlinear frequency responsive circuit exhibiting a jump characteristic or phenomenom for actuating the firing circuit of a proximity fuze.

Other objects and many of the attendant advantages of this invention will be readily appreciated as the same becomes better understood by reference to the following detailed description when considered in connection with the accompanying drawings wherein.

Figure 1:
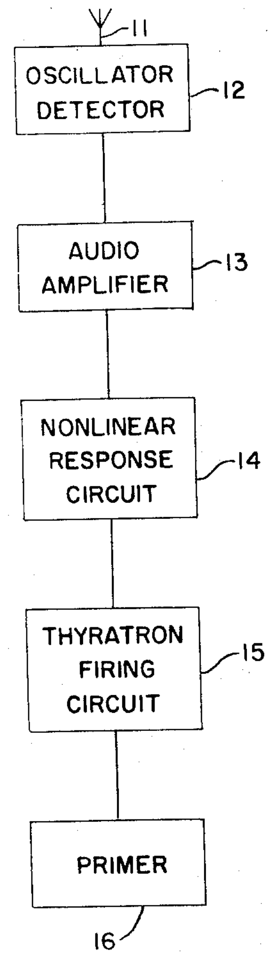
FIG. 1 is a block diagrammatic view broadly indicating the relationship of the circuits in the subject invention.

Referring now to the drawing wherein like reference characters indicate like parts throughout the several views and more particularly to FIG. 1 whereon is shown generally the proximity fuze circuit of the present invention, the operation of which may be described in the following general terms. Fuze antenna 11 radiates an electromagnetic wave generated by the oscillator-detector or oscillator-mixer, circuit 12 into space. Impingement of this wave on a suitable target surface results in a reflection of a portion of this radiated wave back to the fuze antenna 11 whereupon the reflected wave is fed to detector, or mixer, circuit 12 wherein it is mixed with the oscillator frequency to produce a beat, or heterodyned, frequency output signal. The beat or ripple frequency output signal is fed to a pass band audio amplifier 13 wherein it is amplified. Unlike the primarily amplitude responsive proximity fuze circuit, the amplifier output signal is not fed directly to a thyratron firing circuit 15 for detonating the fuze primer 16 when the output signal amplitude exceeds the thyratron ionization potential, but instead the signal is fed into a nonlinear frequency responsive amplifier circuit 14 interposed between the audio amplifier 13 and the thyratron firing circuit 15.

Figure 2:
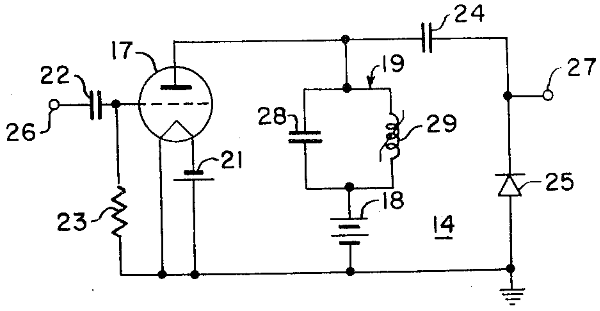
FIG. 2 is a schematic illustration of the circuit diagram of the novel components of the invention.

Referring to FIG. 2, the schematic diagram illustrates in detail the circuit represented by the nonlinear response circuit 14 of FIG. 1. Tube 17 is a vacuum triode connected in a conventional manner with the plate electrode connected to a suitable direct-current plate supply, represented by battery 18, through a tuned plate load circuit, generally indicated by the numeral 19. The filament electrode of tube 17 is connected to a suitable heater supply represented by battery 21, while the tube grid electrode is provided with a series input capacitor 22 and a biasing resistor 23 connected to one terminal of heater supply 21. Series coupled across the tube plate and cathode electrodes are capacitor 24 and diode 25. Terminals 26 and 27 respectively represent the input to the nonlinear response circuit 14 from amplifier 13 and the output of the nonlinear response circuit 14 to the thyratron firing circuit 15.

The tuned plate load circuit 19 of tube 17 is a nonlinear parallel resonant circuit utilizing a linear capacitor 28 and a nonlinear inductor 29. Tuned circuit 19 exhibits a desirable frequency responsive output characteristic by its ability to develop a very rapid voltage output change, or voltage jump, when subjected to an input signal of the proper frequency. The jump characteristic of tuned circuit 19 is largely due to the nonlinear frequency response of inductor 29 which is composed of a number of turns of enamel covered wire wound in the form of a toroid on a magnetic core, such as deltamax, exhibiting a rectangular hysterisis characteristic. For the purpose of emphasizing the nonlinear frequency response characteristic of circuit 19, inductor 29 is biased by the steady state direct current flowing in the plate circuit of tube 17 thereby developing a soft spring jump phenomena to be hereinafter described. The jump output of tuned circuit 19 is fed to condensor 24 and diode 25 which function as a detector-boost circuit for removing the jump output envelope and for increasing the rise time of the jump voltage thereby further emphasizing the nonlinear jump characteristic of circuit 14. Essentially, the additional increase in the rise time is due to the rapid charging of condenser 24 through diode 25 on negative ripple voltage swings and retaining most of this charge during positive voltage swings thereby effectively adding a voltage source in series with the output from the tuned circuit 19.

For a more complete discussion of Jump, or Hysterersis, phenomena, reference can be made to the textbook entitled "Nonlinear Vibrations" by J.J. Stoker, published by Interscience Publishers, Inc., N.Y., N.Y. For descriptive purposes, the circuit 19 exhibiting a rapid voltage variation or jump phenomenom, will hereinafter be described as jump circuit 19.

Figure 3:
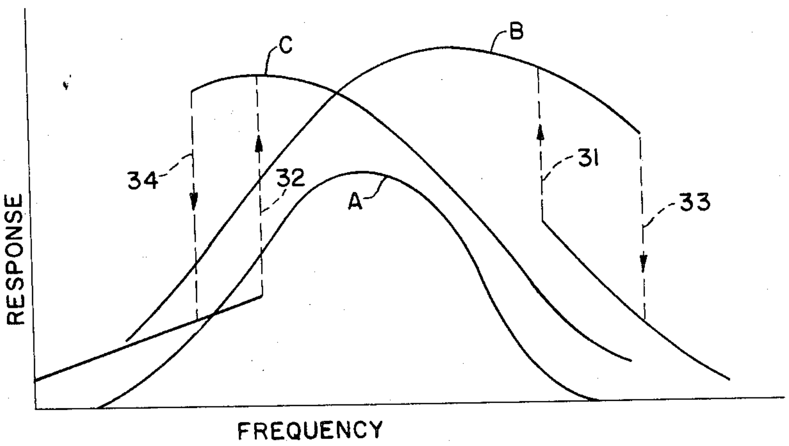
FIG. 3 is a graphical illustration of wave shapes obtained as hereinafter described.

The frequency response characteristics of the nonlinear resonant, or jump, circuit 19 is illustrated by the wave shapes shown on FIG. 3. Wave shape A illustrates the frequency response of a tuned circuit containing a nonlinear inductor and operating below the critical magnetization force point for the particular core material being used. As is indicated by wave shape A, the tuned circuit operating under this condition exhibits no jump, or rapid voltage change, characteristic. Operation of the tuned circuit at greater magnetizing forces than the critical magnetization force increases the resonant frequency of the tuned circuit and the tuned circuit exhibits a jump characteristic as shown by the dotted portions 31 and 33 of wave shape B, which jump characteristic is technically referred to as a hard spring jump characteristic. The application of a suitable direct current bias to the nonlinear inductor of the tuned circuit results in the nonlinear jump characteristic illustrated by the dotted portions 32 and 34 of wave shape C, and which is technically called a soft spring jump characteristic. The shift from a hard to a soft spring characteristic is brought about by a change in the inductance characteristics of a biased inductor as a function of magnetizing force. The dotted portions of wave shapes B and C represent an unstable jump region in the frequency response characteristic of the nonlinear tuned circuit and occurs in the region where the applied frequency and the resonant frequency of the tuned circuit are changing in opposite directions. Dotted portions 33 and 32 of wave shapes B and C indicate the hard and soft spring jumps of the nonlinear tuned circuit as the applied frequency is gradually increased while dotted portions 31 and 34 indicate the hard and soft spring jumps as the applied frequency is gradually decreased. In both the hard and soft spring resonant circuits the nonlinear, or jump, response phenomenon occurs in the region where the applied frequency and the resonant frequency of the tuned circuit are changing in opposite directions. Since the ripple frequency changes with extreme rapidity in a proximity fuze as the fuze approaches the target, the soft spring rapid jump exhibited by the biased nonlinear tuned circuit is utilized in order to accurately select a value of ripple frequency to detonate the fuze primer.

In summary, the disclosed circuit illustrates the development of a frequency actuated proximity fuze firing device utilizing the frequency intelligence contained in the electromagnetic wave energy reflected from a suitable target surface for operation.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. An apparatus for exploding a projectile in proximity to a target, comprising, an oscillator for generating an electromagnetic wave, an antenna coupled to said oscillator for radiating said generated wave and for receiving a target reflected portion of said wave, a detector connected to said oscillator for developing a beat frequency output signal proportional to the frequency variation between the generated and reflected waves, an audio amplifier connected to said detector for amplifying said output signal, amplifier means including a nonlinear frequency responsive resonant network for selectively developing a control signal having an abrupt substantial amplitude variation in response to an amplified output signal of a preselected frequency and firing means connected to said amplifier means for utilizing said control signal to explode said projectile.

2. An amplifier circuit for an ordnance proximity fuze comprising a triode electron tube having an input circuit and an output circuit, a parallel resonant circuit connected to said output circuit, said resonant circuit having a linear capacitor and a nonlinear inductor for developing a substantial amplitude variation in the potential signal across said resonant circuit upon the application of a signal having a preselected frequency relationship to the resonant frequency of said resonant circuit to said input circuit, and a detector-boost circuit including a series connected capacitor and diode coupled to said resonant circuit for removing the envelope of the potential signal across said resonant circuit.

3. A selective amplifier circuit for an ordnance proximity fuze comprising a vacuum tube having at least a cathode, a plate, and a grid, an input circuit connected across said grid and said cathode, said input circuit having a condenser and a resistor, an output circuit connected across said plate and said cathode, said output circuit having a source of direct current potential and a nonlinear frequency responsive resonant circuit, said resonant circuit including a linear capacitor parallel coupled to a nonlinear inductor, said inductor being biased by a suitable direct current constantly flowing in said output circuit, and a detector-boost circuit connected to said plate and said cathode, said circuit including a capacitor series connected to a diode.

4. An apparatus for producing a triggering effect in proximity to an object adapted to reflect electromagnetic energy comprising, an oscillator for generating electromagnetic energy, an antenna coupled to said oscillator for radiating said energy and for receiving any object reflected portion thereof, a mixer circuit connected to said oscillator for heterodyning the generated and reflected energies to produce an output heterodyne signal, an amplifier connected to said mixer for amplifying said heterodyne signal, nonlinear frequency responsive amplifier means for selectively developing a control voltage in response to a heterodyne signal of a particular frequency, said nonlinear amplifier means including an electron discharge device, a parallel connected linear capacitor and nonlinear inductor coupled across said device, and a series connected capacitor and unidirectional current conductive device connected across said electron discharge device, and means connected to said nonlinear amplifier for utilizing said control voltage to produce said triggering effect.

5. An amplifier circuit comprising an electron discharge device having an input circuit and an output circuit, a resonant network connected across said output circuit, said network including a parallel connected linear capacitor and non-linear inductor, and an electrical energy source coupled to said electron device and to said network for energizing said electron device and for selectively biasing said nonlinear inductor to produce a substantial potential variation across said resonant network upon the application of a signal to said input circuit having a preselected frequency relationship relative to the resonant frequency of said network.

* * * * *